Figure 1:
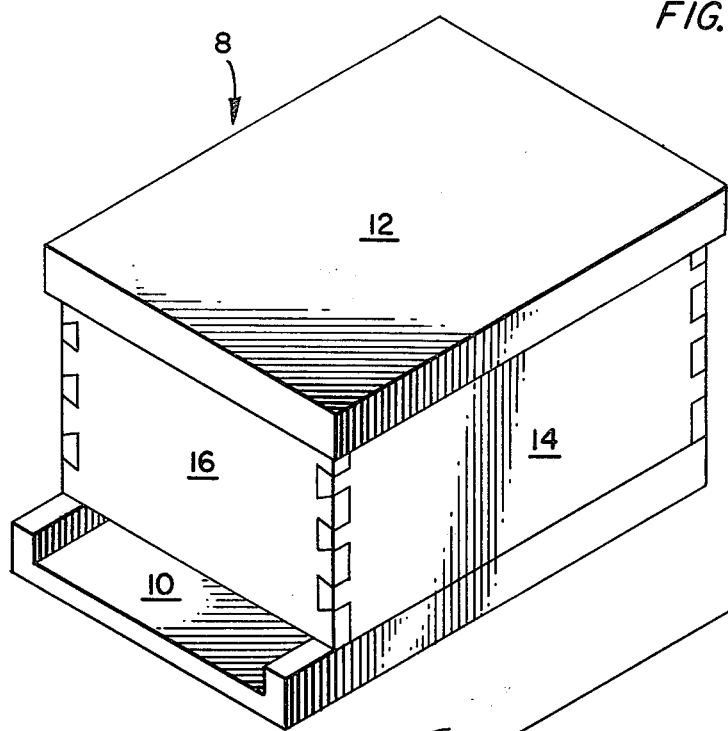

United States Patent [19]

Glasscock et al.

[11] 4,199,832
[45] Apr. 29, 1980

[54] MOLDED POLYURETHANE BEEHIVES

[76] Inventors: David E. Glasscock, P.O. Box 707, Mont Belvieu, Tex. 77580; Jackie B. Pearson, 23230 Bayleaf, Spring, Tex. 77373

[21] Appl. No.: 860,267

[22] Filed: Dec. 13, 1977

[51] Int. Cl.² ............................................ A01K 47/00
[52] U.S. Cl. ............................................ 6/1; 156/78; 521/131
[58] Field of Search ............... 6/1; 521/114, 131, 164, 521/175; 156/78; 264/54

[56] References Cited

U.S. PATENT DOCUMENTS

| | | | |
|---|---|---|---|
| 3,072,582 | 1/1963 | Frost | 521/114 |
| 3,343,186 | 9/1967 | Dunand | 6/1 |
| 3,438,070 | 4/1969 | Florance | 6/1 |
| 3,968,531 | 7/1976 | Cartwright | 6/1 |

FOREIGN PATENT DOCUMENTS 2313394  10/1974  Fed. Rep. of Germany ................. 6/1

Primary Examiner—Jay N. Eskovitz
Attorney, Agent, or Firm—Lawrence I. Field

[57] ABSTRACT

The preparation of beehives from a synthetic resinous material which is acceptable to the bees, which is not attacked by vermin, and which exhibits the requisite physical properties to provide a desirable beehive is accomplished by assembling the hives from molded urethane foam panels, the urethane foam being formulated so as to produce a product which is not rejected by the bees and which does not make the bees nervous or otherwise interfere with their normal habits in secreting honey in said beehive.

4 Claims, 2 Drawing Figures

U.S. Patent    Apr. 29, 1980    4,199,832

MOLDED POLYURETHANE BEEHIVES

This invention relates to the preparation of beehives from a synthetic resinous material which is acceptable to the bees, which is not attacked by vermin, and which exhibits the requisite physical properties to provide a desirable beehive.

More particularly the invention relates to beehives assembled from molded urethane foam panels, the urethane foam being formulated so as to produce a product which is not rejected as a beehive by the bees and which does not make the bees nervous or otherwise interfere with their normal habits in secreting honey in said beehive.

Presently most beehives are constructed of wood. Wooden hives rot even if they are repainted frequently. Because of the inadequacy of wood as a material for beehive structures, substitutes have been sought, and hives, or components of hives have been fabricated, from metal and from non-metal materials, including synthetic resins.

Prior art efforts along these lines are reported in many patents including the following U.S. Patents:
U.S. Pat. No. 3,110,044 issued Nov. 12, 1963;
U.S. Pat. No. 3,343,186 issued Sept. 26, 1967;
U.S. Pat. No. 3,438,070 issued Apr. 15, 1969; and
U.S. Pat. No. 3,968,531 issued July 13, 1976.

Metal hives or metal lined hives have not proven successful in climates where the winter-summer temperature range is large because they tend to be too cold in the winter and too hot in the summer unless they are provided with special insulation and the same is true of non-metals such as glass or other ceramic materials.

With the advent of synthetic resins, attempts have been made to fabricate beehives from the resins, because they can be readily molded to the desired shapes and are usually not attacked by vermin or other insect pests.

One such hive described in U.S. Pat. No. 3,110,044 is made of a polyolefin such as polyethylene or polypropylene. Although such resins are acceptable to the bee colony, the hives have not been entirely satisfactory, possibly because the hives do not provide the insulation necessary to maintain a uniform desired temperature in the hive and possibly because the polymers tend to feel slippery to the bees and not like wood or other natural materials. Furthermore, the relatively slippery polyolefin hives do not stack well. In addition, even if they are manufactured as foamed polyolefin resins as described in U.S. Pat. No. 3,968,531, they do not afford the insulation required for the hive to be maintained at a suitable temperature for the colony to function efficiently in locales where there is a large spread of temperatures with the seasons, unless additional winter insulation is provided.

Other patents in which the use of resins has been reported for beehives include U.S. Pat. Nos. 3,343,186 and 3,438,070 noted above. The latter patent describes a structure which is provided to enclose a beehive and which is made from expanded polyurethane or similar material. A dead air space is created between the beehive and the enclosure and the bees of the hive are never in physical contact with the expanded polyurethane. For reasons which are not fully understood, conventional polyurethane formulations from conventional materials produce an expanded product which bees appear to find objectionable. Hence as described in U.S. Pat. No. 3,343,186 a glass fiber reinforced polyester coating is provided on the inside surfaces of the expanded polyurethane foam so that the bees do not come in actual contact with the urethane.

One object of this invention is to provide a polyurethane composition which can be molded into the components of a beehive (floor, walls, roof, super, and the like) each of which is produced in a simple one-step molding operation, during which said formulation is expanded to produce a panel member made of a foam of a density and thickness appropriate to the climate where the hive is to be used, so as to provide the insulation required to maintain the desired temperature in the hive and thereby increase the efficiency with which the bees function.

Another object of the invention is to provide a hive constructed from components which do not require any lining or other coating inside the hive and which are not attacked by vermin or other insect pests.

A further object of the invention is to provide a hive of construction materials which is capable of being sterilized by chemical and/or physical means in case of fowl brood disease.

Still another object of the invention is to provide a hive in which the water does not condense when the temperature falls, as in winter.

A further object of the invention is to provide urethane formulations which yield a foamed product which is acceptable to a bee colony and which does not require aging in the field before it is acceptable to the bees.

Figure 2:
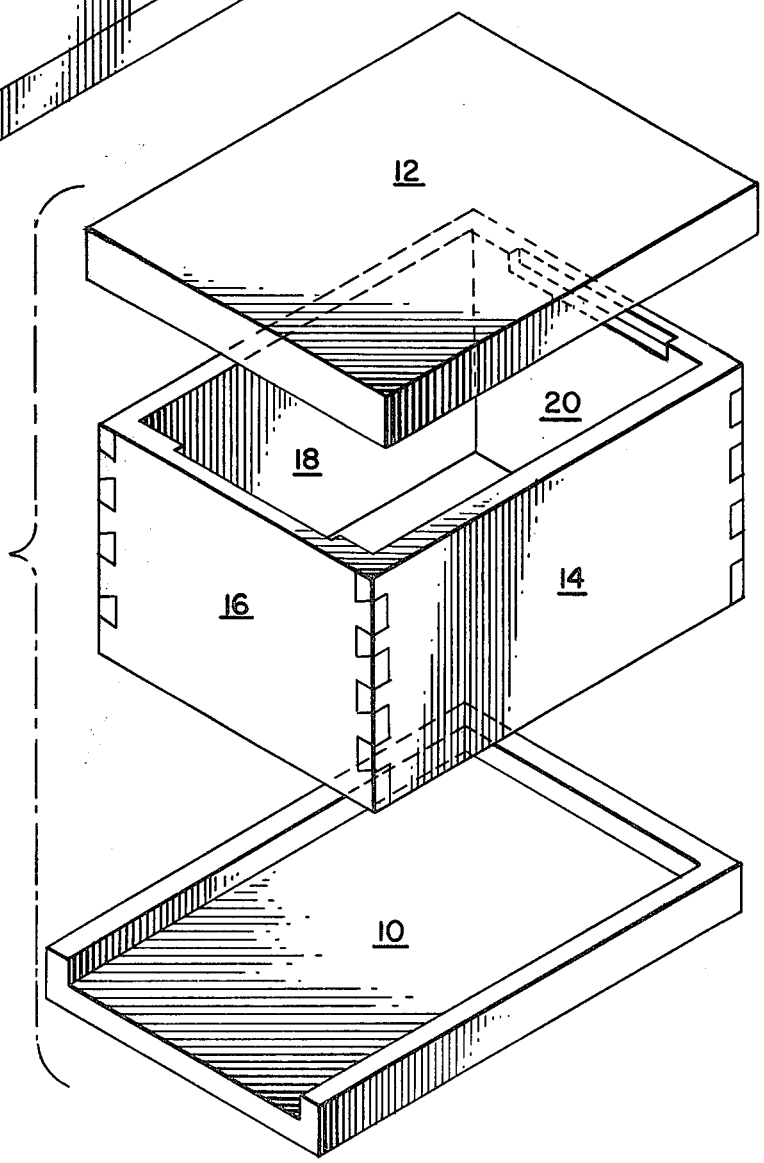

Other objects of the invention will be pointed out or will become apparent from the description which follows, taken in conjunction with the drawings of a hive constructed in accordance with the invention, in which:

FIG. 1 is a view of the beehive in perspective; and
FIG. 2 is an exploded view of the beehive of FIG. 1.

As may be seen from FIG. 2, in its simplest form the beehive is assembled from six molded panels namely, a floor 10 and a roof 12 and four walls 14, 16, 18 and 20 which with the roof and floor define the enclosure in which combs and other accessories are received.

The specific design of the hive is not novel except for the possibility which it provides for varying the thickness and/or density of the hive components so as to provide any desired combination of insulation properties in the completed hive.

The walls may be connected by dovetailed joints, as shown, or they may be nailed to one another, or screwed to one another or even bonded to one another by means of adhesives.

Whatever method of assembling is used, the parts are generally standard in size and interchangeable.

Supers molded from polyurethane foam members are readily added to the hive in the usual way since the dimensions of the hives of this invention conform to the usually accepted standards and principally in the thickness of the panels from which they are constructed.

By varying the wall thickness of such panels, hives are produced which are specifically suited to the climate where the hive will be used. Wall thicknesses between about one-half inch to about two inches provides panels with insulating values for virtually all climates where beehives are used.

The molded hives of the present invention are constructed from six parts (four body parts, one top part and one bottom part).

The hive is designed to be interchangeable and compatible with current wood or other plastic hives in use today and the dimensions conform to the International Standards for beehives. However, by varying the wall thickness of such panels, hives are produced which are specifically suited to the climate where the hive will be used. Wall thicknesses between about one-half inch to about two inches provides panels with insulating values for virtually all climates where beehives are used.

As with wooden hives the corners of these urethane hives need no special fasteners, but can be nailed, screwed, or glued. Other similarities to wood includes the ability to be cut, routed and/or painted.

The advantages as compared with wood hives are better insulating capability, vermin and insect resistance and if coated with a paint or other coating to protect the urethane from ultraviolet degradation, excellent weather resistance. The most practical density foams are lighter than wood.

The hives of the present invention are constructed from structural components made solely of high density polyurethane foam which provides the hive with its total structural support and with the desired degree of thermal insulation. It was found that a high density foam provided the hive with sufficient structural strength to eliminate the need for any other material of construction to provide structural support.

Further if polyurethane foam is not formulated to the proper density, the insulation factor is too low. If it is too low, it becomes necessary to provide an additional insulating layer, e.g. as described in U.S. Pat. No. 3,343,186. Without such insulation, the efficiency of the bees to manufacture honey is substantially impaired whenever the ambient temperature departs from the optimum.

It was further found that foams exhibiting a density of 4–50 pounds per cubic foot, have reduced thermal efficiency as compared with lower density foams but this was offset by their greatly enhanced structural strength properties. The wall thickness can be varied to provide needed insulation factors for colder climates. The lower density urethane foams 2–3 pounds per cubic foot have excellent thermal insulation properties but have poor structural strength and hence where low density urethane foams have been used for beehive walls, additional structural support material in the form of skins have proven necessary to provide support.

When formulating a urethane foam system to be used for producing panels which are to be assembled into beehives, a number of factors must be considered.

The first restriction on any formulation is whether or not the chemicals used in the formulation produce a foamed product which the bees reject. Clearly if the bees will not inhabit the hive, the hive is commercially useless.

Beehives produced from the following formulation were rejected by the bees when first prepared. After aging for three months by exposure to the outdoor weather in a field, the bees nervously accepted the hive but did not gain in strength to the same extent as bee colonies in other hives in the same location, but made from other materials.

| FORMULATION A (parts by weight) | |
| --- | --- |
| Sucrose Based Polyether Polyol of 450 Hydroxyl Number | 50 |
| Polyether Polyester Polyol of 400 Hydroxyl Number | 50 |
| Tetramethyl Butane Diamine | 1.0 |
| Triethylenediamine | 1.0 |
| Silicone Surfactant | 1.0 |
| Monofluorotrichloromethane | 10.0 |
| Total | 113 |
| Polymeric Polyphenylmethyl Polyisocyanate With a 2.7 Functionality | 136.0 |

The above formulation contains two amine catalysts. The tetramethyl butane diamine is a very volatile catalyst and is of course harsh to the skin and eyes of humans as are most amines. The other amine, triethylenediamine is a solid product of low volatility. It was suspected that at least the highly volatile amine might be offensive to the bees. This is why it was decided to "age" the hive in the field in an attempt to permit the volatile amine to escape from the urethane matrix. After three months ambient aging a significant amount of the volatile amine appeared to have dissipated because no amine odor was evident. However, the bees only nervously accepted the hive and did not grow in strength as did the bees in neighboring urethane hives, formulated from other formulations, described hereinafter.

Formulations which had been used on the hives in which the bee colonies were gaining in strength and which were accepted readily by the bees were found to have been formulated from each of the three following formulations:

| FORMULATION B | |
| --- | --- |
| Amine Containing Polyether Polyol of the 490 Hydroxyl Number | 40.0 |
| Polyether Polyester Polyol of 400 Hydroxyl Number | 60.0 |
| Triethylenediamine | 0.3 |
| Silicone Surfactant | 1.0 |
| Monofluorotrichloro Methane | 10.0 |
| Total | 111.2 |
| Polymeric Polyphenylmethyl Polyisocyanate with a 2.7 Functionality | 142.9 |

| FORMULATION C | |
| --- | --- |
| Sucrose Amine Based Polyether Polyol of 425 Hydroxyl Number | 50 |
| Polyether Polyol of 355 Hydroxyl Number | 50 |
| Triethylenediamine | 0.35 |
| Dibutyl Tin DiLaurate | 0.10 |
| Silicone Surfactant | 1.0 |
| Trifluorotrichloroethane | 15.0 |
| Total | 116.45 |
| Polymeric Polyphenylmethyl Polyisocyanate with a 2.7 Functionality | 131.5 |

| FORMULATION D | |
| --- | --- |
| Amine Containing Polyether Polyol of 445 Hydroxyl Number | 50 |
| Sucrose Based Polyether Polyol of 490 Hydroxyl Number | 50 |
| Triethylenediamine Solution in Dimethylethanol Amine | 0.2 |
| Silicone Surfactant | 1.0 |
| Water | 0.4 |
| Trifluorotrichloroethane | 9.0 |
| Total | 110.6 |
| 80% Polymeric Polyphenylmethyl Polyisocyanate | |

| -continued | |
|---|---|
| FORMULATION D | |
| with 3.2 Functionality | |
| 20% Toluene Diisocyanate | 130.0 |

Several formulations contain triethyelenediamine catalyst which indicate that the bees are not offended by this amine catalyst. In Formulation D the catalyst is a blend of 80% dimethyl ethanol amine (DMEA) and 20% triethylenediamine. The DMEA is a volatile amine, but unlike the tetramethyl butane diamine it reacts with the isocyanate to become a permanent part of the polymer network. This seems to explain why the bees accepted hives from Formulation D and not from Formulation A. Formulation C contains a metal catalyst indicating that metal catalyst present no problems for the bees.

The polyols in Formulations B, C, and D contain nitrogen in their structure and are therefore amines in their own right, but because the nitrogen is locked into the polyol it does not seem to offend the bees.

The other major ingredient in the formulations is the isocyanate. All of the commercially available polyisocyanates yielded a foamed urethane which was found to be acceptable to the bees.

From the above Examples, the following generalizations can be made.

A density range of from 2 pounds per cubic foot up to 75 pounds per cubic foot may be used but because of problems which exist at the extreme ends of this density range it is preferred to prepare foamed components exhibiting a density between 3½ and 40 pounds per cubic foot. Panels with too low a density prepared using polyols from which food value can be derived were found to attract unwanted insects. At the high density extreme unneeded weight and thereby additional cost are added. Also higher density foams have higher k-factors and lower insulation values. A low k-factor is desirable to aid the bees in keeping the hive temperature constant.

A particularly preferred density is from 8 to 9 pounds per cubic foot, because foams of this density give an optimum combination of foam forming agent in the strength and desired k-factor value.

The polyol(s), isocyanates, catalyst and foaming agent are well known and their selection except for the amine is within the present state of the art.

Suitable polyols include natural (castor oil) or propoxylated, ethoxylated, and/or otherwise modified esters or ethers of alcohols, acids, amines, or any component having an active hydrogen atom capable of reacting with isocyanate, etc., provided they are capable of forming a rigid foam.

The isocyanate can be polymeric methyl-phenyl type or toluene diisocyanate (TDI) type, or any other isocyanate having a functionality greater than 1.8 and capable of reacting with the polyols to form a rigid foam.

Catalyst can be amines (tertiary or modified secondarys), inorganic, organo-metallic, dielectric fields, heat, or any other chemical, electronic or physical addition or combination of such as to modify the reaction rate of the components. Some catalyst can also be co-reactants. However it is essential that the amine cannot be volatile to the extent that rejection by the bees occurs at least in non-aged hives.

The foam formulations utilized can be halocarbon (monofluorotrichloromethane, trifluorotrichloroethane, difluorodichloromethane, trifluoromonochloromethane and dichloromethane), carbon dioxide, air, or hydrocarbon expanded either during or preceding the reaction of components to the extent desired for proper density control Fillers can be added to modify color, density, viscosity, early and final strengths, insulation value or costs of finished goods, and subject to their acceptability to the bees.

In producing the foamed polyurethane hive parts (sides, bottom, top, etc.), the preparation of the formulation, foaming of the same, molding, demolding and assembling the hive follow generally conventional procedures.

The several ingredients are weighed and are then introduced into a vessel of suitable size in the order in which they are listed in the above formulations, that is, polyol(s) first, and isocyanate(s) last. The resulting composition is mechanically mixed which causes it to foam and the foam is then poured into a suitably conditioned mold, the surface of which has been treated with a release agent.

After a suitable time interval, depending on the formulation, the part is demolded. Any flash on the demolded part is trimmed and the part is ready to be painted or otherwise prepared, prior to assembly into a complete hive, e.g. by means of nails, screws, or other fastening means, or the hive may be assembled and then painted.

The mold in which the urethane composition is foamed is usually provided with a lid or cover, so that the composition is confined to a definite volume which it fills as a result of the foaming reaction. A release paper is usually inserted over the top of the mold cavity before the cover is placed on the same, the release paper functioning to provide a porous layer whereby the air entrapped in the mold cavity as the foam rises therein can escape thus minimizing air pockets and voids in the molded part, or the mold may be properly vented in its construction to avoid air entrapment.

After a sufficient cure time the molded part is removed from the mold, and stripped from the same.

The several hive parts, sides, bottom and top and/or super, are assembled in much the same manner as parts of a wooden hive and the hive is then ready to be placed in service.

Having now described the invention, it is not intended that it be limited except as may be required by the appended claims.

We claim:

1. A beehive constructed of panels molded with wall thicknesses of between about one-half inch and two inches, of closed cell polyurethane foam having a density of between 4 and 50 pounds per cubic foot, namely: a molded bottom, a molded cover and molded wall panels, and means for securing said panels to form a beehive which is acceptable to a bee colony, said foam having been formed by foaming a composition including:
   (a) at least one polyol;
   (b) at least one amine catalyst;
   (c) at least one foaming agent; and
   (d) at least one isocyanate;
   and wherein the amine catalyst is selected from the group consisting of amines exhibiting a sufficiently low vapor pressure in the foamed polyurethane product that the foamed polyurethane beehive is acceptable to the bees.

2. The beehive of claim 1 wherein the panels are molded with wall thicknesses between about one-half inch and two inches.

3. The beehive of claim 1 in which the polyurethane is a high density foam exhibiting a density between $3\frac{1}{2}$ and 40 pounds per cubic foot.

4. The beehive of claim 3 in which the density is from 8 to 9 pounds per cubic foot.

* * * * *